United States Patent
Chang et al.

(10) Patent No.: US 10,491,014 B2
(45) Date of Patent: Nov. 26, 2019

(54) BATTERY MANAGEMENT SYSTEM AND METHOD FOR EXTENDING TIME UNTIL A BATTERY REACHES AN OVER-DISCHARGED STATE DURING STORAGE OF AN INFORMATION HANDLING SYSTEM

(71) Applicant: DELL PRODUCTS, L.P., Round Rock, TX (US)

(72) Inventors: Chia-Fa Chang, Linkou Township (TW); Wen-Yung Chang, Jhong Li (TW); Tun-Chieh Liang, Taipei (TW); Richard C. Thompson, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 460 days.

(21) Appl. No.: 14/331,994

(22) Filed: Jul. 15, 2014

(65) Prior Publication Data
US 2016/0020624 A1     Jan. 21, 2016

(51) Int. Cl.
*H02J 7/00* (2006.01)
*H02J 9/00* (2006.01)

(52) U.S. Cl.
CPC .......... *H02J 7/0029* (2013.01); *H02J 7/0077* (2013.01); *H02J 9/002* (2013.01); *H02J 2007/004* (2013.01)

(58) Field of Classification Search
CPC .................................................. H02J 7/0029

USPC .......................................................... 320/136
See application file for complete search history.

(56) References Cited

U.S. PATENT DOCUMENTS

| | | | |
|---|---|---|---|
| 2011/0072280 A1* | 3/2011 | Chiasson | G06F 1/30 713/300 |
| 2013/0067256 A1* | 3/2013 | Shiraishi | G01R 31/3606 713/320 |
| 2014/0058595 A1* | 2/2014 | Li | H01M 10/42 701/22 |
| 2014/0167700 A1* | 6/2014 | Chen | H02J 7/0072 320/134 |
| 2014/0181566 A1* | 6/2014 | Morimura | G06F 1/263 713/340 |
| 2015/0022956 A1* | 1/2015 | Olson | H05K 7/00 361/679.01 |

(Continued)

*Primary Examiner* — Drew A Dunn
*Assistant Examiner* — Harry O'Neill-Becerril
(74) *Attorney, Agent, or Firm* — Isidore PLLC

(57) ABSTRACT

A computer-implemented method extends the time until the battery reaches an over-discharged state of an information handling system during storage. The method comprises determining if a first battery parameter is outside an associated first battery parameter specification. When the first battery parameter is outside the associated first battery parameter specification, a power management controller isolates the battery by turning off a charge/discharge field effect transistor. The method also includes determining if the first battery parameter is outside an associated second battery parameter specification. In response to the first battery parameter being outside the associated second battery parameter specification, the power management controller is triggered to enter a minimum power state to further reduce power consumption from the battery.

18 Claims, 8 Drawing Sheets

(56) References Cited

U.S. PATENT DOCUMENTS

2015/0036389 A1\* 2/2015 Freeman ................ H02M 1/10
                                                                363/16

\* cited by examiner

BATTERY MANAGEMENT SYSTEM AND METHOD FOR EXTENDING TIME UNTIL A BATTERY REACHES AN OVER-DISCHARGED STATE DURING STORAGE OF AN INFORMATION HANDLING SYSTEM

BACKGROUND

1. Technical Field

The present disclosure generally relates to battery management and in particular to extending the time until a battery reaches an over-discharged state during storage of an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems utilize batteries as either a primary power source or as a backup power source. One example of an information handling system that uses batteries is a laptop computer. The battery allows the laptop computer to be used in a mobile setting without being connected to a source of utility power. Lithium ion (Li-ion) batteries are widely used in laptop computers. Li-ion batteries can be formed from one or more Li-ion cells and offer a high energy density and long life.

After the information handing system has been manufactured, it is often stored for a period of time before use. The storage can occur during shipping, in a warehouse or in a store. In other cases, such as in a school setting, the information handing system can be stored for long periods such as during summer vacation. During storage of an information handling system, various components continue to consume low levels of power. Examples of components that continue to consume power during storage are the battery level gauge circuit, power management controller, clock, and other system components. Additionally, cell self discharge operates to lower the amount of stored energy over time. This discharge occurs even if the battery is isolated from the system and is a factor in the time for the battery to reach critical discharge failure. If enough time elapses with the information handing system in storage, the battery may become discharged and not be able to power on the information handling system. If additional time elapses with the information handing system in storage, the battery can become over discharged or critically discharged and consequently become unable to be recharged and/or damaged. Examples of damage to battery cells may include copper dissolution and gas evolution

BRIEF SUMMARY

Disclosed is a computer implemented method, a battery management system and an information handling system that extends the time until a battery reaches an over-discharged state during storage of an information handing system.

According to one embodiment, the battery management system comprises a battery and a charge/discharge field effect transistor (FET) coupled to the battery. A controller is coupled to the battery and to the charge/discharge FET. The controller has firmware executing thereon to enable extending the time until the battery reaches an over-discharged state. The firmware configures the controller to monitor a first elapsed time after a last detected system management bus communication and compare the first elapsed time to a first elapsed time threshold. In response to the first elapsed time being greater than the first elapsed time threshold, the controller retrieves a first battery parameter. The controller determines if the first battery parameter is outside an associated first battery parameter specification. In response to the first battery parameter being outside the associated first battery parameter specification, the controller isolates the battery from the system load by turning off the charge/discharge FET. Turning off the charge/discharge FET reduces power consumption from the battery and extends battery life. After the battery has been isolated from the system load, the discharge rate of the battery is due to power draw by the controller and from self-discharge of the battery. The controller determines if the first battery parameter is outside an associated second battery parameter specification. In response to the first battery parameter being outside the associated second battery parameter specification. The controller triggers the controller to enter into a minimum power state. The controller entering into the minimum power state further reduces power consumption from the battery and further extends the time until the battery reaches an unrecoverable state or permanent fail state through over-discharging. After the controller has entered the minimum power state, the discharge rate of the battery is due to power draw from self-discharge of the battery.

According to another embodiment, the method comprises monitoring a first elapsed time after a last detected system management bus communication. The first elapsed time is compared to a first elapsed time threshold. In response to the first elapsed time being greater than the first elapsed time threshold, a first battery parameter is retrieved. The method further includes determining if the first battery parameter is outside an associated first battery parameter specification. In response to the first battery parameter being outside the associated first battery parameter specification, the battery is isolated from the system load by turning a charge/discharge field effect transistor (FET) off. Turning off the charge/discharge FET reduces power consumption from the battery and extends the time until the battery reaches an over-discharged state. After the battery has been isolated from the system load, the discharge rate of the battery is due to power draw from the controller and from self-discharge of the battery. The method also includes determining if the first battery parameter is outside an associated second battery parameter specification. In response to the first battery parameter being outside the associated second battery parameter specification, a controller is triggered to enter a minimum power state in which the controller enters into a minimum power state. The controller entering into the minimum power state further reduces power consumption from the battery and further extends the time until the battery reaches an over-discharged state. After the controller has entered the minimum power state, the discharge rate of the battery is due to power draw from self-discharge of the battery.

Also disclosed is an information handling system (IHS) that comprises a battery operable to supply power to the information handling system. A charge/discharge field effect transistor (FET) is coupled to the battery. A controller is coupled to the battery and to the charge/discharge field effect transistor. The controller has firmware executing thereon to enable extending the time until the battery reaches an over-discharged state during storage. The firmware configures the controller to monitor a first elapsed time after a last detected system management bus communication and to compare the first elapsed time to a first elapsed time threshold. In response to the first elapsed time being greater than the first elapsed time threshold, the controller retrieves a first battery parameter. The controller determines if the first battery parameter is outside an associated first battery parameter specification. In response to the first battery parameter being outside the associated first battery parameter specification, the controller isolates the battery from the system load by turning off the charge/discharge FET. Turning off the charge/discharge FET reduces power consumption from the battery and extends the time until the battery reaches an over-discharged state. After the battery has been isolated from the system load, the discharge rate of the battery is due to power draw from the controller and from self-discharge of the battery. The controller determines if the first battery parameter is outside an associated second battery parameter specification. In response to the first battery parameter being outside the associated second battery parameter specification, the controller triggers the controller to enter into a minimum power state. The controller entering into the minimum power state further reduces power consumption from the battery and further extends the time until the battery reaches an over-discharged state. After the controller has entered the minimum power state, the discharge rate of the battery is due to power draw from self-discharge of the battery.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a battery management system, an information handling system and a computer implemented method performed within the information handling system to extend the time until the battery reaches an over-discharged state during storage of the information handing system.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
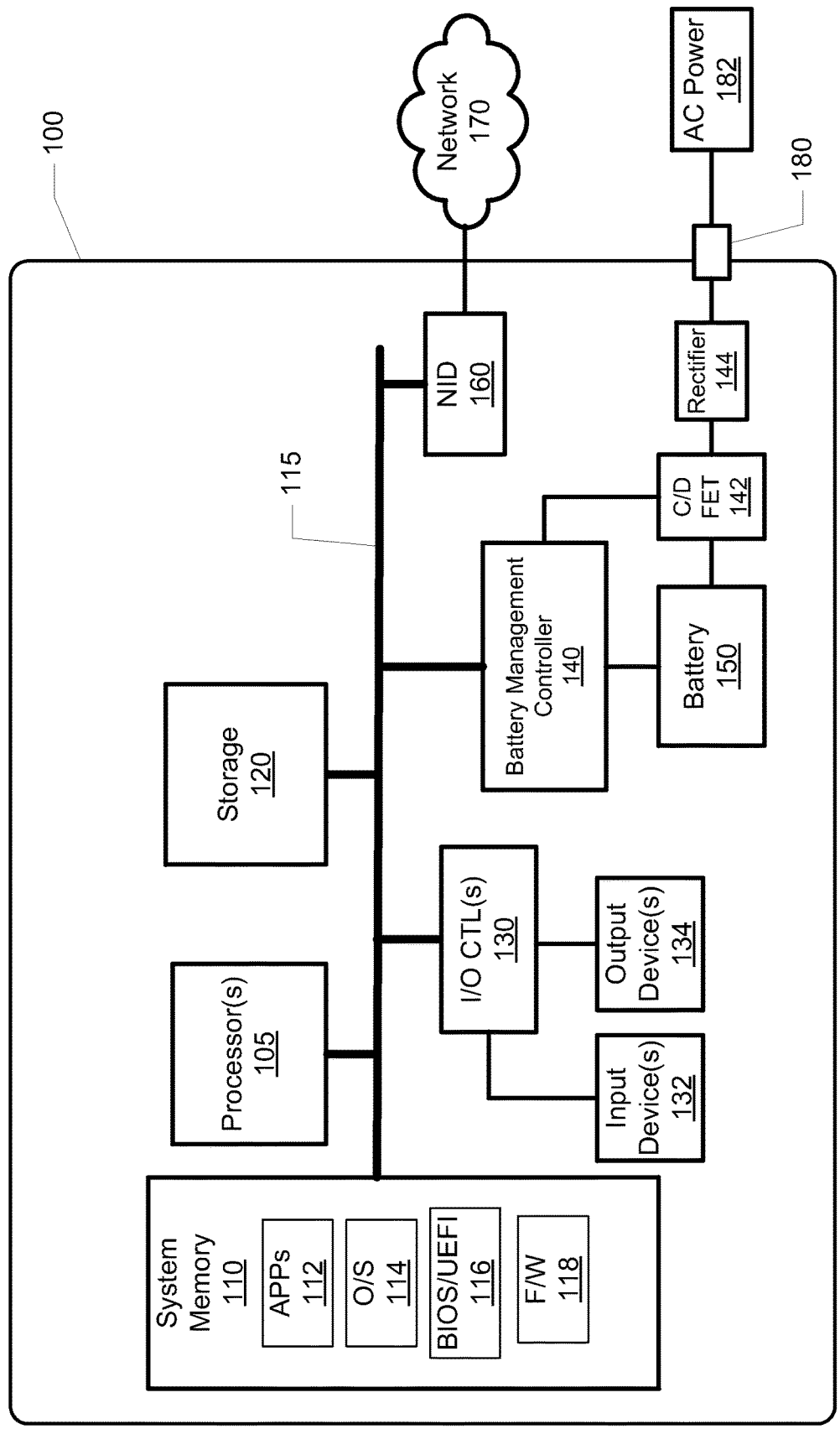
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output device(s) 134, such as a monitor or display device or audio speaker(s) or light emitting diodes (LEDs).

Additionally, in one or more embodiments, IHS 100 includes one or more batteries or battery pack(s) 150 that supply power to various components of IHS 100. In one embodiment, battery 150 can be multiple Li-ion cells that are connected either in series or in parallel. Battery 150 can supply a range of voltages and currents depending upon the requirements of IHS 100. Battery 150 can supply a finite amount of power without recharging (often referred to as battery capacity). Battery 150 also has a time until the battery reaches an unrecoverable state, or a permanent failure state due to over-discharging (beyond the battery capacity). If battery 150 becomes over discharged, the battery will enter the over-discharged state or permanent failure state.

IHS 100 further includes a battery management controller (BMC) 140 that is connected to battery 150. Battery management controller 140 is communicatively coupled with processor(s) 105 and system memory 110 via system interconnect 115. BMC 140 is further connected to a charge/discharge field effect transistor (FET) 142 which is also connected to battery 150. In one embodiment, BMC 140 controls the charging and discharging of battery 150 via charge/discharge FET 142. BMC 140 contains components that enable extending the life of battery 150 during storage of IHS 100. BMC 140 can at least partially control the operation of battery 150. Battery management controller 140 can also be referred to as a battery management unit (BMU) or simply as a controller. An AC power source 182 is connectable to an AC power connector 180 to provide power to IHS 100 and to recharge battery 150. The AC power connector 180 is connected to a rectifier 144 that supplies DC power to charge/discharge FET 142. Charge/discharge FET 142 is connected between rectifier 144 and battery 150 by a power line. BMC 140 is connected to charge/discharge FET 142 by a communication signal line. BMC 140 controls the application to and draining of power from battery 150 via charge/discharge FET 142.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
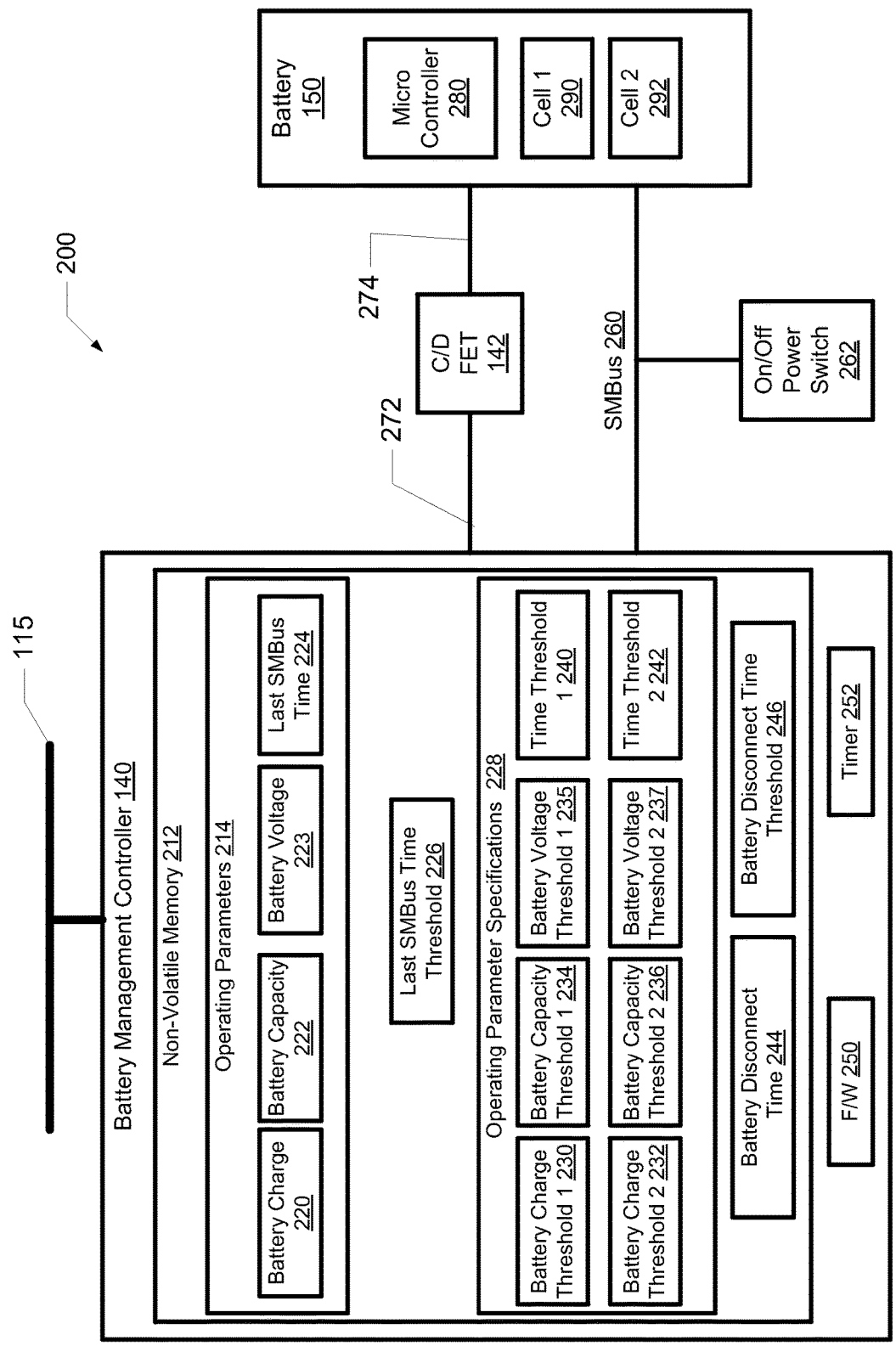
FIG. 2 illustrates a component level view of a battery management sub-system having a battery management controller and other functional components that support extending the time until the battery reaches an over-discharged state during storage, in accordance with one embodiment.

With reference now to FIG. 2, there is illustrated one embodiment of a component level view of a battery management sub-system 200 that supports extending the life of battery 150 during storage of IHS 100. In the description of FIG. 2, reference will also be made to FIG. 1. Battery management sub-system 200 comprises battery management controller (BMC) 140, charge/discharge FET 142 and battery 150. BMC 140 is coupled to system interconnect 115 in order to communicate with other components of IHS 100. BMC 140 is coupled to charge/discharge FET 142 by a communication cable or line 272. Charge/discharge FET 142 is coupled to battery 150 by a power cable or line 274. A system management bus (SMBus) 260 is connected between BMC 140 and battery 150. On/off power switch 262 is in communication with SMBus 260. SMBus 260 can detect the cycling of on/off power switch 262 and cause IHS 100 to turn on or to turn off. SMBus 260 is a two wire bus that allows communication between a micro-controller 280 internal to battery 150 and BMC 140. SMBus 260 carries clock, data and instruction signals. Micro-controller 280 can transmit information about battery 150 such as voltage and current levels and other data to BMC 140 via SMBus 260. Battery 150 can include one or more cells such as cell 1 290 and cell 2 292 that are connected either in series or in parallel.

BMC 140 includes an internal non-volatile memory 212. Non-volatile memory 212 can be a persistent storage device such as flash memory that retains data without power. In at least one embodiment, non-volatile memory 212 can store operating parameters 214 and operating parameter specifications 228. Operating parameters 214 can include data that is specific to the present operation of battery 150. Operating parameters 214 can include battery charge 220, battery capacity 222, battery voltage 223 and last SMBus time 224. Battery charge value 220 represents the percentage of a full charge state that remains in battery 150. Battery capacity value 222 represents the remaining capacity state or energy in battery 150. Battery voltage 223 is the voltage produced by battery 150. In one embodiment, battery capacity value 222 can be provided in watt-hours. Last SMBus time 224 is the elapsed time since BMC 140 has detected communication on SMBus 260. During storage of IHS 100, no SMBus communication occurs unless on/off power switch 262 is depressed or the AC power source 182 is connected to AC power connector 180 (FIG. 1).

Operating parameter specifications 228 includes operating ranges and thresholds for operating parameters 214. Operating parameter specifications 228 include battery charge threshold 1 230, battery charge threshold 2 232, battery capacity threshold 1 234, battery capacity threshold 2 236, battery voltage threshold 1 235, battery voltage threshold 2 237, last SMBus communication elapsed time threshold 1 240 and last SMBus communication elapsed time threshold 2 242. Battery charge threshold 1 230 and battery charge threshold 2 232 represent threshold levels of battery charge remaining in battery 150. If the battery charge falls outside of thresholds 230 and/or 232, BMC 140 acts to reduce energy consumption by IHS 100. Battery capacity threshold 1 234 and battery capacity threshold 2 236 represent threshold levels of battery capacity remaining in battery 150. If the battery capacity falls below thresholds 234 and/or 236, BMC 140 acts to reduce energy consumption by IHS 100. Battery voltage threshold 1 235 and battery voltage threshold 2 237 represent threshold levels of battery voltage in battery 150. If the battery voltage falls below thresholds 235 and/or 237, BMC 140 acts to reduce energy consumption by IHS 100 and/or by battery subsystem, respectively. Last SMBus communication elapsed time threshold 1 240 and last SMBus communication elapsed time threshold 2 242 represent the elapsed times since valid communication has been detected on SMBus 260.

Non-volatile memory 212 can further store battery disconnect time 244 and battery disconnect time threshold 246. Battery disconnect time 244 is the elapsed time that battery 150 is disconnected from IHS 100. Battery disconnect time 244 is tracked by BMC 140 and stored in non-volatile memory 212. In one embodiment, battery 150 is disconnected from IHS 100 in order to install a new battery 150. Battery disconnect time threshold 246 is the minimum time for battery 150 to be disconnected from IHS 100 for BMC 140 to determine that battery 150 is disconnected. BMC 140 further includes firmware (F/W) 250 and a timer 252. Firmware (F/W) 250 executes within BMC 140 to extend the life of battery 150 during storage. Timer 252 is used to track last SMBus communication elapsed time threshold 1 240, last SMBus communication elapsed time threshold 2 242 and battery disconnect time 244.

During operation of IHS 100, firmware 250 runs or executes on BMC 140. Firmware 250 functions to extend the life of battery 150 during storage. BMC 140 monitors last SMBus time 224 and compares the last SMBus time 224 to last SMBus communication elapsed time threshold 226. In response to the last SMBus time 224 being greater than the last SMBus communication elapsed time threshold 226, BMC 140 retrieves at least one of the battery parameters (i.e., battery charge 220, battery capacity 222, last SMBus elapsed time 224). BMC 140 determines if the battery parameter is outside an associated battery parameter specification (e.g., current battery charge is less than battery charge threshold 1 230, current battery capacity is less than battery capacity threshold 1 234, time since last SMBus activity is greater than last SMBus communication elapsed time threshold 1 240). In response to the battery parameter being outside the associated battery parameter specification, BMC 140 isolates the battery from the system load by turning off charge/discharge FET 142. Turning off the charge/discharge FET 142 reduces power consumption from the battery and extends the time until the battery reaches an over-discharged state. After battery 150 has been isolated from the system load, the discharge rate of the battery is due to power draw from BMC 140 and from self-discharge of the battery. BMC 140 determines if the retrieved battery parameter(s) (i.e., battery charge 220, battery capacity 222, last SMBus elapsed time 224) is outside an associated second battery parameter specification (e.g., current battery charge is less than battery charge threshold 2 232, current battery capacity is less than battery capacity threshold 2 236, time since last SMBus activity is greater than last SMBus communication elapsed time threshold 2 242). In response to the battery parameter being outside the associated second battery parameter specification, BMC 140 enters a minimum power state. BMC 140 entering into the minimum power state further reduces power consumption from the battery and further extends the time until the battery reaches an over-discharged state. After BMC 140 has entered the minimum power state, the discharge rate of battery 150 is due to power draw from self-discharge of the battery.

In one embodiment, BMC 140 determines if the battery charge value 220 is outside the specification (i.e., less than a threshold battery charge level 1 230). If the battery charge value 220 is less than the battery charge threshold 1 level 230, BMC 140 decreases power consumption by isolating the battery from the system load by turning off charge/discharge FET 142. After battery 150 has been isolated from the system load, the discharge rate of the battery is due to power draw from BMC 140 and from self-discharge of the battery. If BMC 140 determines that the remaining battery charge value 220 is also less than another battery charge threshold 2 level 232, BMC 140 triggers itself to enter a minimum power state. After BMC 140 has entered the minimum power state, the discharge rate of battery 150 is due to power draw from self-discharge of the battery.

In another embodiment, BMC 140 determines if the battery capacity value 222 is outside the specification (i.e., less than a battery capacity threshold 1 level 234). If the battery capacity value 222 is less than the battery capacity threshold 1 level 234, BMC 140 decreases power consumption by isolating the battery from the system load via turning off charge/discharge FET 142. After battery 150 has been isolated from the system load, the discharge rate of the battery is due to power draw from BMC 140 and from self-discharge of the battery. If BMC 140 determines that the battery capacity value 222 is also less than another battery capacity threshold 2 level 236, BMC 140 triggers itself to enter a minimum power state. After BMC 140 has entered the minimum power state, the discharge rate of battery 150 is due to power draw from self-discharge of the battery.

In another embodiment, BMC 140 determines if the battery voltage value 223 is outside the specification (i.e., less than a battery voltage threshold 1 level 235). If the battery voltage value 223 is less than the battery voltage threshold 1 level 235, BMC 140 decreases power consumption by isolating the battery from the system load via turning off charge/discharge FET 142. After battery 150 has been isolated from the system load, the discharge rate of the battery is due to power draw from BMC 140 and from self-discharge of the battery. If BMC 140 determines that the battery voltage value 223 is also less than another battery voltage threshold 2 level 237, BMC 140 triggers itself to enter a minimum power state. After BMC 140 has entered the minimum power state, the discharge rate of battery 150 is due to power draw from self-discharge of the battery.

In an additional embodiment, BMC 140 determines if the last SMBus communication time 224 (i.e., elapsed time since BMC 140 has detected communication on SMBus 260) is outside the specification (e.g., greater than a first SMBus communication time threshold 1 240). If the last SMBus communication time 224 is greater than a first SMBus communication time threshold 1 240, BMC 140 decreases power consumption by isolating the battery from the system load by turning off charge/discharge FET 142. After battery 150 has been isolated from the system load, the discharge rate of the battery is due to power draw from BMC 140 and from self-discharge of the battery. If BMC 140 determines that the last SMBus communication time 224 is also greater than a second SMBus communication time threshold 2 242, BMC 140 triggers itself to enter a minimum power state. After BMC 140 has entered the minimum power state, the discharge rate of battery 150 is due to power draw from self-discharge of the battery.

Those of ordinary skill in the art will appreciate that the hardware components and basic configuration depicted in FIGS. 1-2 and described herein may vary. For example, the illustrative components within IHS 100 (FIG. 1) and battery management subsystem 200 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 3:
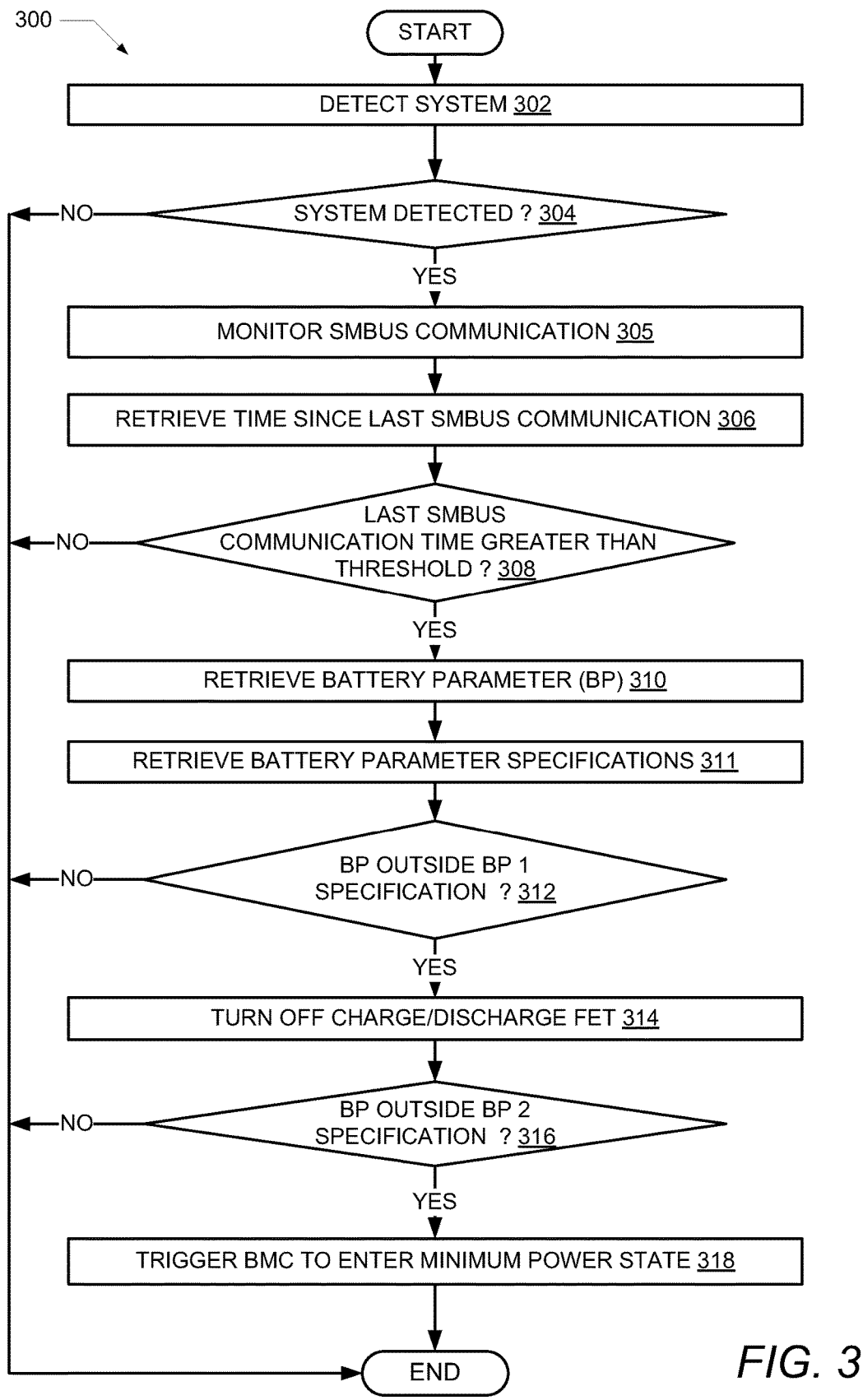
FIG. 3 is a flow chart illustrating one example of the method by which the time until the battery reaches an over-discharged state is extended, based on either battery charge or capacity, during storage of an information handling system, according to one or more embodiments.
Figure 4:
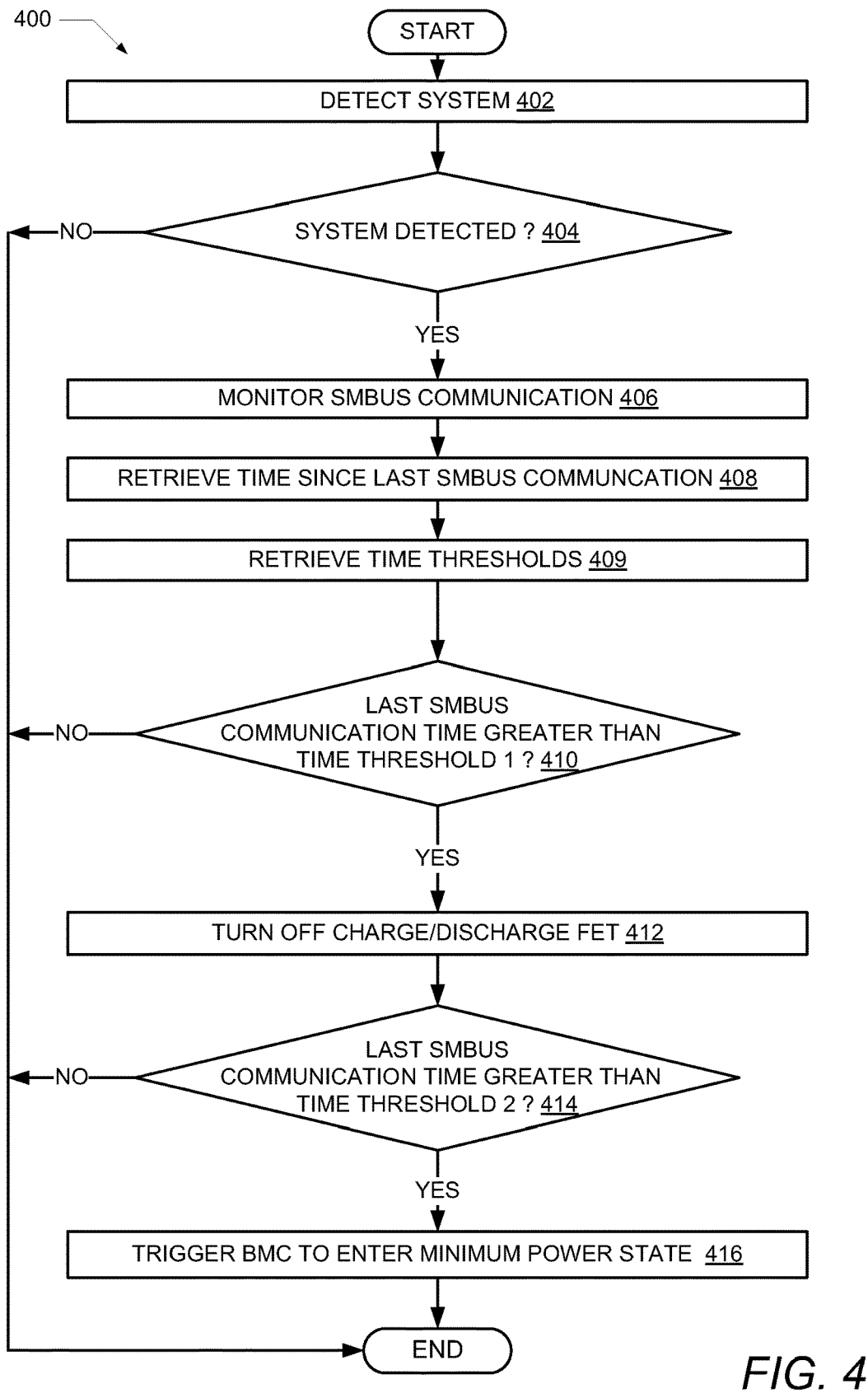
FIG. 4 is a flow chart illustrating another example of the method by which the time until the battery reaches an over-discharged state is extended, based on storage time, during storage of an information handling system, according to one or more embodiments.
Figure 5:
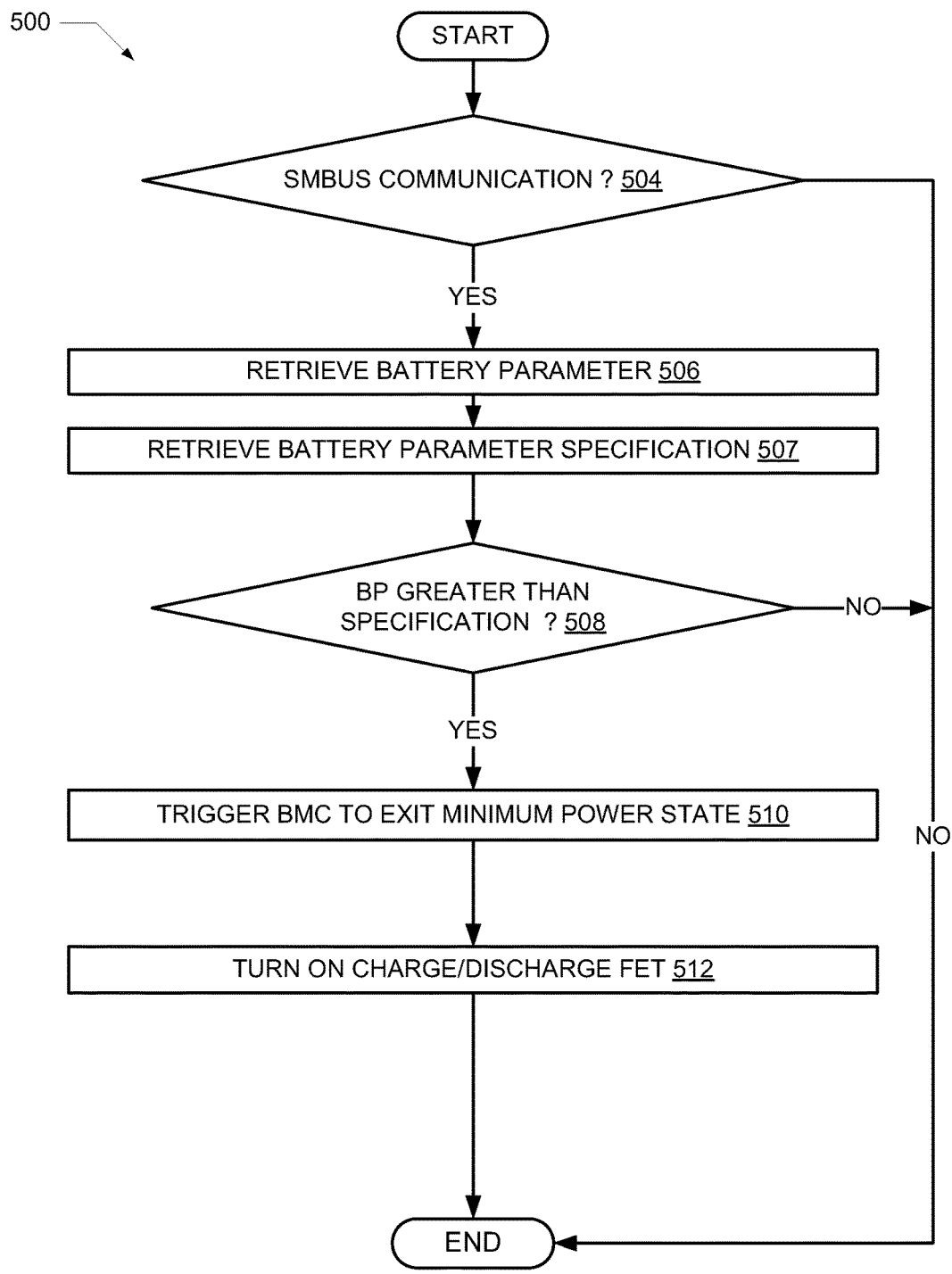
FIG. 5 is a flow chart illustrating one example of the method by which a battery management controller exits a minimum power state, according to one or more embodiments.

The following flowcharts of FIGS. 3-5 disclose specific functionality provided by BMC 140 and specifically by the execution of firmware 250 within BMC 140 related to extending the life of battery 150 during storage. According to one embodiment, firmware 250 includes program code that when executed configures BMC 140 to provide the various functions described within the present disclosure.

FIGS. 3-7 illustrate flowcharts of exemplary methods by which BMC 140 within the preceding figures performs different aspects of the processes that enable the one or more embodiments of the disclosure. Generally, methods 300 and 400 collectively represent computer-implemented methods to extend the life of battery 150 during storage of IHS 100. Methods 500, 600 and 700 collectively represent computer-implemented methods for BMC 140 to exit a storage mode. The description of each method is provided with general reference to the specific components illustrated within the preceding FIGS. 1-2. Generally, each method is described as being implemented via battery management subsystem 200 and particularly the execution of code provided by firmware 250 within BMC 140. It is however appreciated that certain aspects of the described methods may be implemented via other processing devices and/or execution of other code.

Method 300 illustrates a process for extending the life of battery 150 during storage of IHS 100 based on battery charge or capacity. Method 300 begins at the start block and proceeds to block 302 where BMC 140 detects if IHS 100 is present and connected to BMC 140. In response to IHS 100 not being detected (block 304), method 300 ends. In response to IHS 100 being detected, BMC 140 monitors communication on SMBus 260 (block 305) and retrieves an elapsed time after a last detected system management bus communication 224 (block 306). At decision block 308, BMC 140 compares the last SMBus communication elapsed time 224 to a last SMBus communication time threshold 226 and determines if the last SMBus communication elapsed time 224 is greater than the last SMBus communication time threshold 226.

In response to the elapsed time 224 being greater than the last SMBus communication time threshold 226, BMC 140 retrieves at least one battery parameter 214 (i.e., battery charge 220, battery capacity 222) (block 310) and retrieves battery charge threshold 1 230 and battery charge threshold 2 232 and/or battery capacity threshold 1 234 and battery capacity threshold 2 236 (block 311). At decision block 312, BMC 140 determines if the retrieved battery parameter is outside an associated first battery parameter specification (i.e., one or more of battery charge threshold 1 230 and battery capacity threshold 1 234). In response to the battery parameter being outside the associated first battery parameter specification, BMC 140 transmits a signal along wire 272 to isolate the battery from the system load by turning off charge/discharge FET 142 (block 314). Turning off the charge/discharge FET 142 reduces power consumption from the battery and extends the time until the battery reaches an over-discharged state. In response to the battery parameter not being outside the associated first battery parameter specification, method 300 terminates.

At decision block 316, BMC 140 determines if the retrieved battery parameter 214 (i.e., battery charge 220, battery capacity 222) is outside an associated second battery parameter specification (i.e., battery charge threshold 2 232, battery capacity threshold 2 236 or last SMBus elapsed time threshold 2 242). In response to the battery parameter being outside the associated second battery parameter specification, BMC 140 triggers itself to enter minimum power state into a minimum power state (block 318). BMC 140 entering into the minimum power state further reduces power consumption from the battery and further extends the time until the battery reaches an over-discharged state. In response to the battery parameter not being outside the associated second battery parameter specification, method 300 ends.

In one embodiment, BMC 140 determines at block 312 if the battery charge value 220 is less than a threshold battery charge level 230. If the battery charge value 220 is less than the threshold battery charge level 230, BMC 140 decreases power consumption by turning off charge/discharge FET 142 (block 314). If BMC 140 determines at decision block 316 that the remaining battery charge value 220 is also less than another threshold battery charge level 232, BMC 140 triggers itself to enter a minimum power state (block 318).

In another embodiment, BMC 140 determines at block 312 if the battery capacity value 222 is less than a threshold battery capacity level 234. If the battery capacity value 222 is less than the threshold battery capacity level 234, BMC 140 decreases power consumption by turning off charge/discharge FET 142 (block 314). If BMC 140 determines at block 316 that the battery capacity value 222 is also less than another threshold battery charge level 236, BMC 140 triggers itself to enter a minimum power state (block 318).

Referring to FIG. 4, method 400 illustrates another process for extending the life of battery 150 during storage of IHS 100 based on elapsed storage time. Method 400 begins at the start block and proceeds to block 402 where BMC 140 detects if IHS 100 is present and connected to BMC 140 (decision block 404). In response to IHS 100 not being detected, method 400 ends. In response to IHS 100 being detected, BMC 140 monitors communication on SMBus 260 (block 406) and retrieves an elapsed time after a last detected SMBus communication 224 (block 408). BMC 140 retrieves time threshold 1 240 and time threshold 2 242 at block 409. At decision block 410, BMC 140 compares the last SMBus communication time 224 to time threshold 1 240 and determines if the last SMBus communication time 224 is greater than the time threshold 1 240. In response to the last SMBus communication time 224 being greater than time threshold 1 240, BMC 140 decreases power consumption by transmitting a signal along wire 272 to isolate the battery from the system load by turning off charge/discharge FET 142 (block 412). In response to the elapsed time 224 not being greater than the last SMBus communication time threshold 226, method 400 ends.

At decision block 414, BMC 140 compares the last SMBus communication time 224 to time threshold 2 242 and determines if the last SMBus communication time 224 is greater than the time threshold 2 242. In response to the last SMBus communication time 224 being greater than time threshold 2 240, BMC 140 triggers itself to enter minimum power state into a minimum power state (block 416). BMC 140 entering into the minimum power state further reduces power consumption and further extends the time until the battery reaches an over-discharged state. In response to the elapsed time 224 not being greater than time threshold 2 242, method 400 ends.

FIG. 5 illustrates a method 500 for BMC 140 to exit the minimum power state and enter into a fully functional "on" state. Method 500 begins at the start block and proceeds to decision block 504 where BMC 140 detects communication on SMBus 260 and determines if communication has occurred on SMBus 260). In one embodiment, communication occurs on SMBus 260 when AC power 182 is connected to AC power connector 180. In response to communication not occurring on SMBus 260, method 500 ends. In response to communication occurring on SMBus 260, BMC 140 retrieves at least one battery operating parameter 214 (i.e., battery charge 220, battery capacity 222) (block 506) and retrieves the associated battery operating parameter specification 228 (e.g., battery charge threshold 1 230, battery capacity threshold 1 234) (block 507). At decision block 508, BMC 140 determines if the retrieved battery parameter is greater than the associated battery parameter specification (i.e., battery charge threshold 1 230 and battery capacity threshold 1 234). In response to the battery parameter being greater than the associated first battery parameter specification, BMC 140 triggers itself to exit the minimum power state and enter an on state (block 510) and to transmit a signal on wire 272 to turn on charge/discharge FET 142 (block 512). In response to the battery parameter being less than the associated first battery parameter specification, method 500 terminates.

Figure 6:
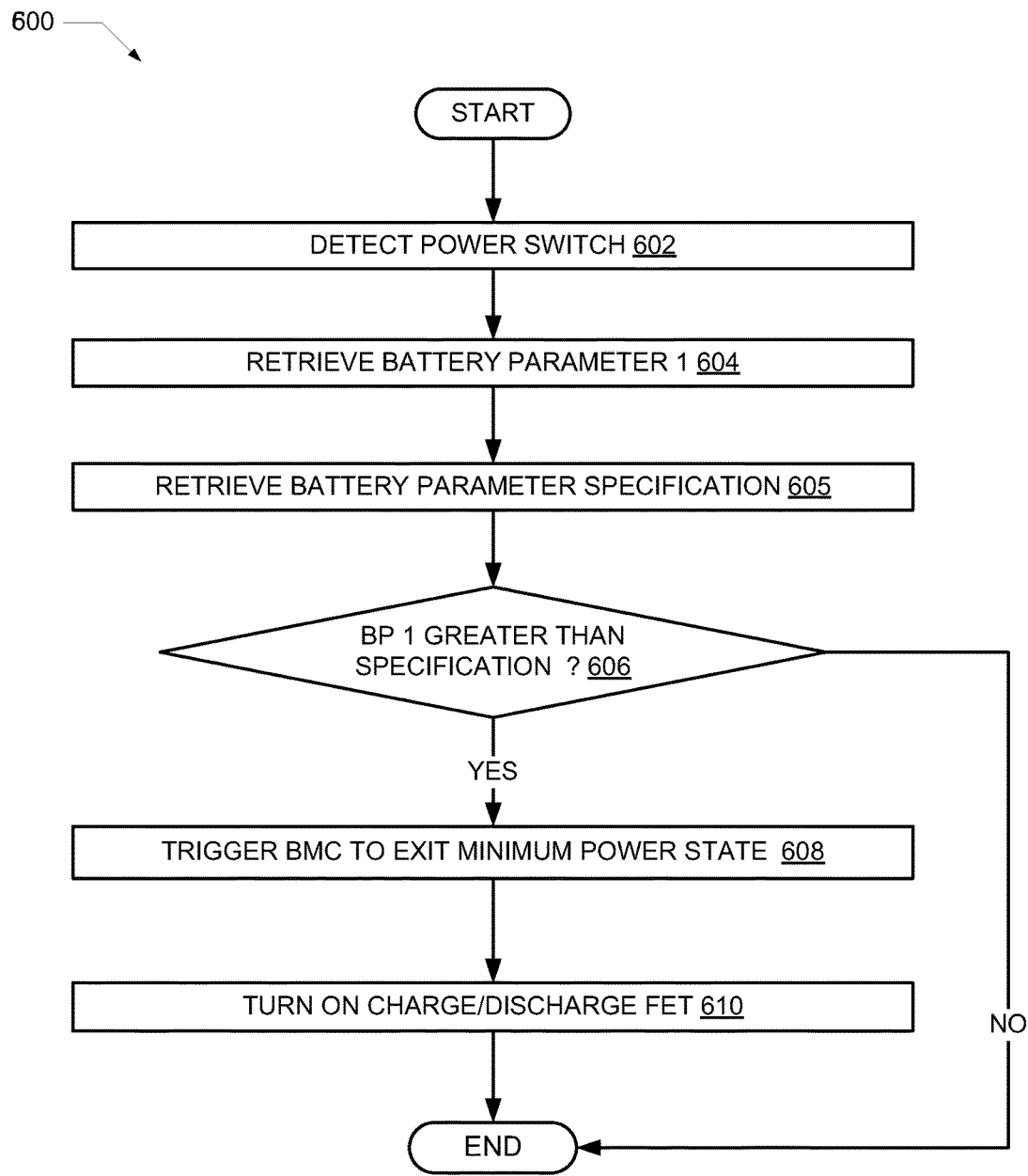
FIG. 6 is a flow chart illustrating another example of the method by which a battery management controller exits a minimum power state, according to one or more embodiments.

FIG. 6 illustrates another method 600 for BMC 140 to exit the minimum power state and enter into a fully functional "on" state. Method 600 begins at the start block and proceeds to block 602 where BMC 140 detects if on/off power switch 262 has been depressed. In response to on/off power switch 262 being depressed, BMC 140 retrieves at least one battery operating parameter 214 (i.e., battery charge 220, battery capacity 222) (block 604) and retrieves the associated battery operating parameter specification 228 (e.g., battery charge threshold 1 230, battery capacity threshold 1 234) (block 605). At decision block 606, BMC 140 determines if the retrieved battery parameter is greater than the associated battery parameter specification (i.e., battery charge threshold 1 230 and battery capacity threshold 1 234). In response to the battery parameter being greater than the associated first battery parameter specification, BMC 140 triggers itself to exit the minimum power state and enter an "on" state (block 608) and to transmit a signal on wire 272 to turn on charge/discharge FET 142 (block 610). In response to the battery parameter being less than the associated first battery parameter specification, method 600 terminates.

Figure 7:
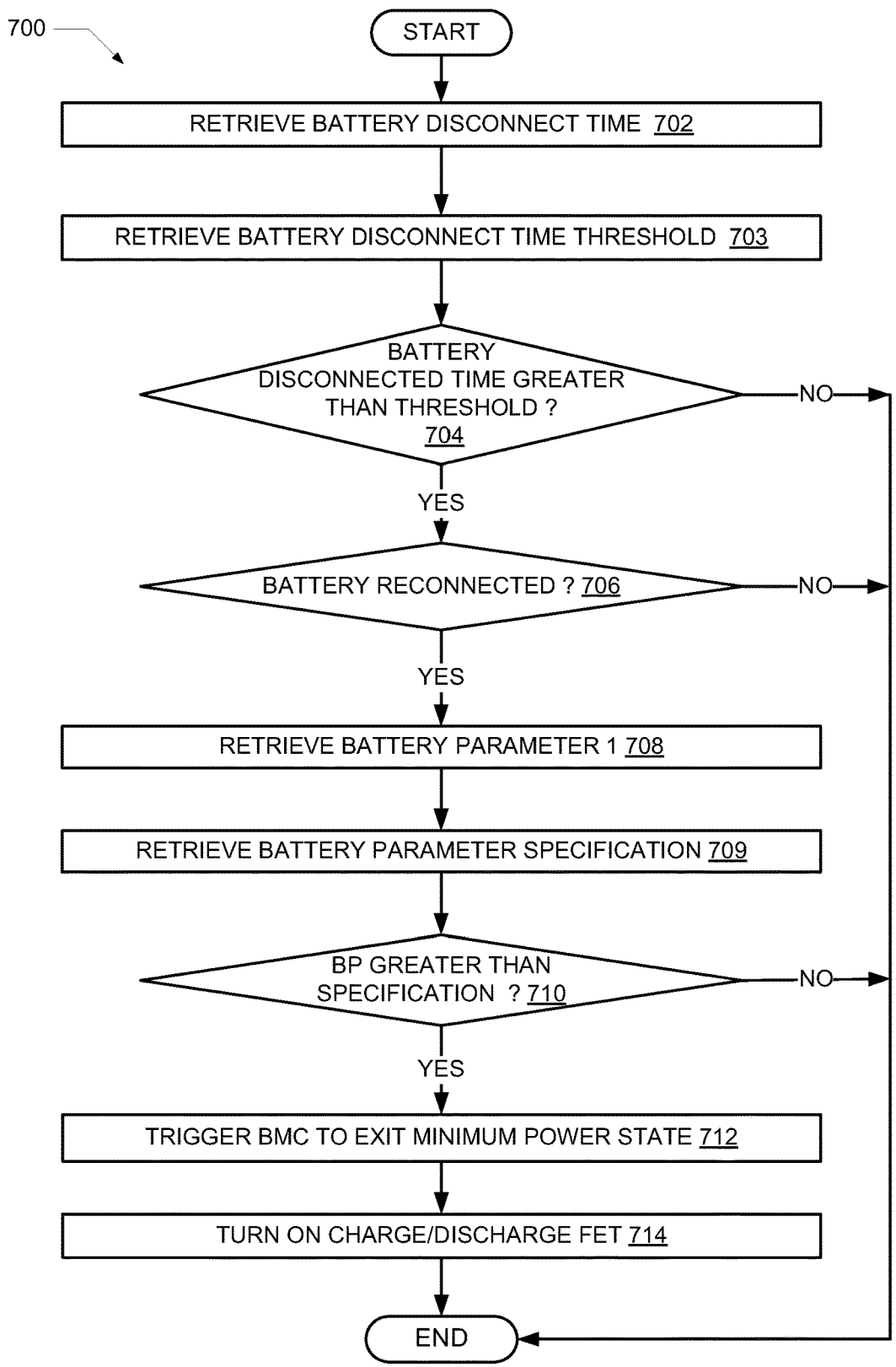
FIG. 7 is a flow chart illustrating an additional example of the method by which a battery management controller exits a minimum power state, according to one or more embodiments.

FIG. 7 illustrates an additional method 700 for BMC 140 to exit the minimum power state and enter into a fully functional "on" state. Method 700 begins at the start block and proceeds to block 702 where BMC 140 retrieves battery disconnect time 244 and retrieves battery disconnect time threshold 246 (block 703). BMC 140 determines if battery disconnect time 244 is greater than a battery disconnect time threshold 246 (decision block 704). In one embodiment, battery disconnect time threshold 246 can be approximately 10 seconds. In response to the battery disconnect time 244 not being greater than the battery disconnect time threshold 246, method 700 ends. In response to the battery disconnect time 244 being greater than the battery disconnect time threshold 246, BMC 140 determines if battery 150 has been reconnected to IHS 100 (decision block 706). In one embodiment, battery 150 is reconnected to IHS 100 when a new battery is installed. In response to battery 150 not being reconnected to IHS 100, method 700 terminates. In response to battery 150 being reconnected to IHS 100, BMC 140 retrieves at least one battery operating parameter 214 (i.e., battery charge 220, battery capacity 222) (block 708) and retrieves the associated battery operating parameter specification 228 (e.g., battery charge threshold 1 230, battery capacity threshold 1 234) (block 709). At decision block 710, BMC 140 determines if the retrieved battery parameter is greater than the associated battery parameter specification (i.e., battery charge threshold 1 230 and battery capacity threshold 1 234). In response to the battery parameter being greater than the associated first battery parameter specification, BMC 140 triggers itself to exit the minimum power state and enter an "on" state (block 712) and to transmit a signal on wire 272 to turn on charge/discharge FET 142 (block 714). In response to the battery parameter being less than the associated first battery parameter specification, method 700 terminates.

Figure 8:
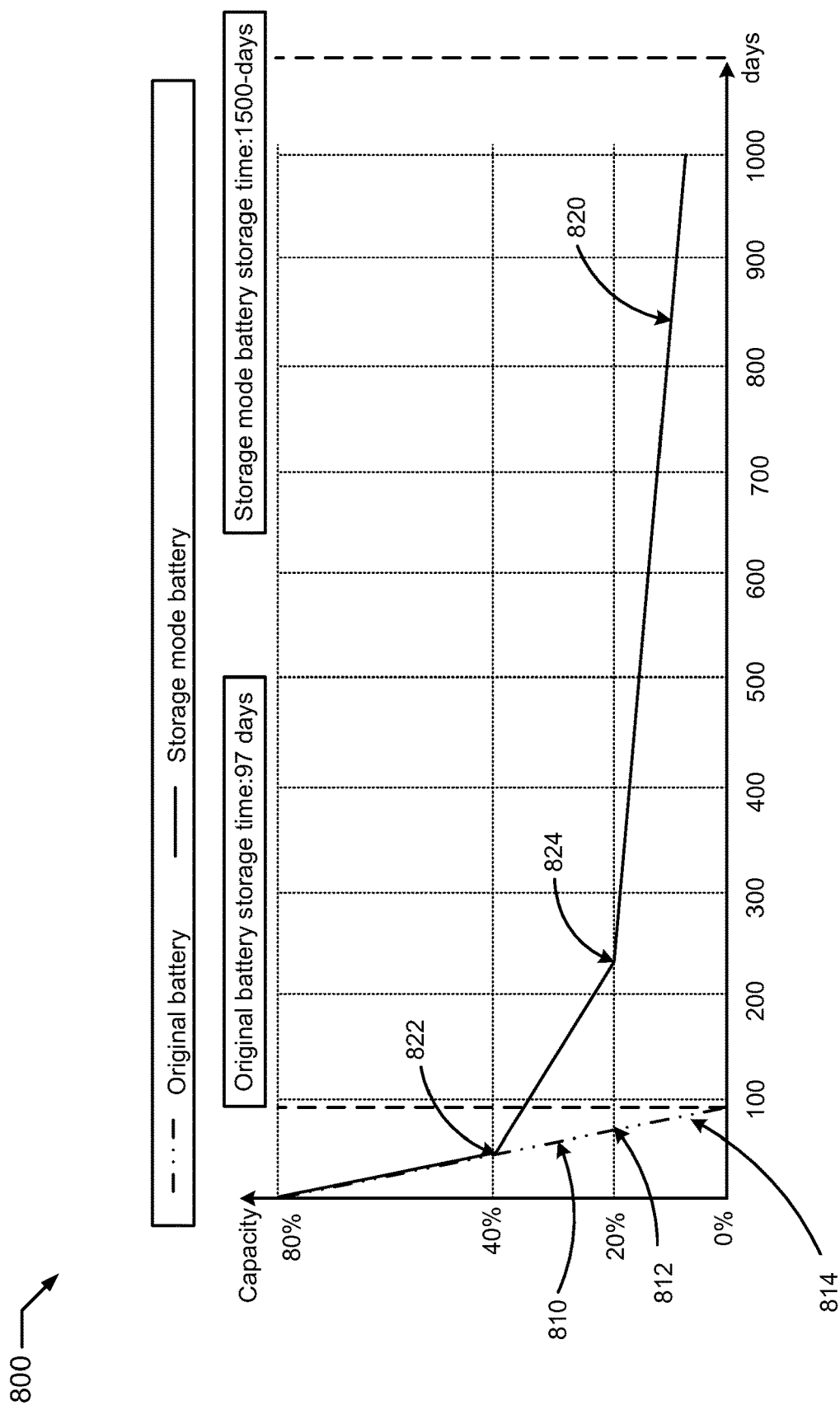
FIG. 8 is a graph of battery capacity versus time illustrating the use of the method by which the time until the battery reaches an over-discharged state is extended, according to one or more embodiments.

FIG. 8 illustrates a graph 800 of battery capacity versus time with and without the use of methods 300 or 400 to extend the time until the battery reaches an over-discharged state. Line 810 shows that without the use of a battery extending method, battery 150 will last 97 days until the battery enters an over discharged state. Point 812 of line 810 indicates where battery 150 is no longer able to supply enough power to operate IHS 100. Point 814 of line 810 indicates where battery 150 enters an over discharged state. Line 820 shows that with the use of battery extending methods 300 or 400, battery 150 will last more than 1000 days until the battery enters an over discharged state. Point 822 of line 820 indicates where BMC 140 turns off charge/discharge FET 142. Point 824 of line 820 indicates where BMC 140 triggers itself to enter a minimum power state.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entire hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method to extend a time until a battery reaches an over-discharged state during storage of an information handling system (IHS), the method comprising:
    determining if a first battery parameter is outside an associated first battery parameter specification during storage of the information handling system;
    in response to the first battery parameter being outside the associated first battery parameter specification during storage of the information handling system, a power management controller turning off a charge/discharge field effect transistor (FET) to reduce power consumption and extend the time until the battery reaches the over-discharged state, wherein the battery is isolated from the system load by turning off the charge/discharge FET, and wherein after the battery is isolated from the system load, further discharge of the battery is due to power draw from the controller and from self-discharge of the battery;
    determining if the first battery parameter is outside an associated second battery parameter specification during the storage of the information handling system;
    in response to the first battery parameter being outside the associated second battery parameter specification during storage of the information handling system, triggering the controller to enter into a minimum power state that further reduces power consumption and further extends the time until the battery reaches the over-discharged state, until a trigger condition is detected that provides power to the information handling system;
    determining whether the trigger condition has occurred following entry by the controller into the minimum power state, the trigger condition being one of (i) communication occurring on a system management bus (SMBus) in response to power being connected to a power connector, (ii) detection of a depressing of an on/off power switch after the power is connected to the power connector;
    in response to the trigger condition, a management controller of the IHS:
        exiting the minimum power state and entering an on state; and transmitting a signal on a connecting wire to turn on the charge/discharge FET;
    determining if the battery has been disconnected from the information handling system for greater than a first time period;
    in response to the battery being disconnected for greater than the first time period, determining if the battery has been reconnected; and
    in response to the battery being reconnected, triggering the power management controller to exit the minimum power state and enter an on state.

2. The method of claim 1, further comprising:
    monitoring a first elapsed time after a last detected system management bus communication;
    comparing the first elapsed time to a first elapsed time threshold;
    in response to the first elapsed time being greater than the first elapsed time threshold, retrieving the first battery parameter;
    monitoring a second elapsed time after a last detected system management bus communication;
    comparing the second elapsed time to a second elapsed time threshold; and
    in response to the second elapsed time being greater than the second elapsed time threshold, triggering the controller to enter the storage mode.

3. The method of claim 1, wherein the first battery parameter comprises at least one of a battery charge value, a battery capacity value, a battery voltage value and the first elapsed time.

4. The method of claim 1, wherein the first battery parameter specification comprises at least one of a battery charge threshold, a battery capacity threshold, a battery voltage threshold, a first battery elapsed time threshold, and a second battery elapsed time threshold.

5. The method of claim 1, further comprising:
    determining if another system management bus communication has occurred; and
    in response to the other system management bus communication occurring, triggering the power management controller to exit the minimum power state and enter into an on state.

6. The method of claim 1, further comprising:
    determining if a power switch has been cycled; and
    in response to the power switch being cycled, triggering the power management controller to exit the minimum power state and enter into an on state.

7. A battery management system for extending a time until a battery reaches an over-discharged state during storage, the battery management system comprising:
    a battery;
    a charge/discharge field effect transistor coupled to the battery;
    a power management controller coupled to the battery and to the charge/discharge field effect transistor (FET), the controller having firmware executing thereon to enable extending the time until the battery reaches the over-discharged state, wherein the firmware configures the controller to:
        determine if a first battery parameter is outside an associated first battery parameter specification during storage of an information handling system in which the battery management system exists;
        in response to the first battery parameter being outside the associated first battery parameter specification during storage of the information handling system, extend the time until the battery reaches the over-discharged state by turning off the charge/discharge FET to reduce power consumption, wherein the battery is isolated from the system load by turning off the charge/discharge FET, and wherein after the battery is isolated from the system load, further discharge of the battery is due to power draw from the controller and from self-discharge of the battery;

determine if the first battery parameter is outside an associated second battery parameter specification during the storage of the information handling system;

in response to the first battery parameter being outside the associated second battery parameter specification during storage of the information handling system, trigger the controller to further extend the time until the battery reaches an over-discharged state by entering into a minimum power state, which further reduces power consumption, until a trigger condition is detected that provides power to the information handling system;

determining whether the trigger condition has occurred following entry by the controller into the minimum power state, the trigger condition being one of (i) communication occurring on a system management bus (SMBus) in response to power being connected to a power connector, (ii) detection of a depressing of an on/off power switch after the power is connected to the power connector;

in response to the trigger condition, a management controller of the IHS:
exiting the minimum power state and entering an on state; and transmitting a signal on connecting wire to turn on the charge/discharge FET;

determine if the battery has been disconnected from the information handling system for greater than a first time period;

in response to the battery being disconnected for greater than the first time period, determine if the battery has been reconnected; and in response to the battery being reconnected, trigger the power management controller to exit the minimum power state and enter an on state.

8. The battery management system of claim 7, wherein the firmware further configures the power management controller to:
monitor a first elapsed time after a last detected system management bus communication;
compare the first elapsed time to a first elapsed time threshold;
in response to the first elapsed time being greater than the first elapsed time threshold, retrieve the first battery parameter;
monitor a second elapsed time after a last detected system management bus communication;
compare the second elapsed time to a second elapsed time threshold; and
in response to the second elapsed time being greater than the second elapsed time threshold, trigger the power management controller to enter the storage mode.

9. The battery management system of claim 7, wherein the first battery parameter comprises at least one of a battery charge value, a battery capacity value, a battery voltage value and the first elapsed time.

10. The battery management system of claim 7, wherein the first battery parameter specification comprises at least one of a battery charge threshold, a battery capacity threshold, a battery voltage threshold, a first battery elapsed time threshold, and a second battery elapsed time threshold.

11. The battery management system of claim 7, wherein the firmware further configures the power management controller to:

determine if another system management bus communication has occurred; and in response to the other system management bus communication occurring, trigger the power management controller to exit the minimum power state and enter into an on state.

12. The battery management system of claim 7, wherein the firmware further configures the power management controller to:
determine if a power switch has been cycled; and
in response to the power switch being cycled, trigger the power management controller to exit the minimum power state and enter into an on state.

13. An information handling system (IHS) comprising:
a battery operable to supply power to the information handling system;
a charge/discharge field effect transistor (FET) coupled to the battery;
a power management controller coupled to the battery and to the charge/discharge field effect transistor, the controller having firmware executing thereon to enable extending the time until the battery reaches an over-discharged state during storage, wherein the firmware configures the power management controller to:
determine if the first battery parameter is outside an associated first battery parameter specification;
in response to the first battery parameter being outside the associated first battery parameter specification, turn off the charge/discharge FET to reduce power consumption and extend the time until the battery reaches an over-discharged state, wherein the battery is isolated from the system load by turning off the charge/discharge FET, and wherein after the battery is isolated from the system load, further discharge of the battery is due to power draw from the controller and from self-discharge of the battery;
determine if the first battery parameter is outside an associated second battery parameter specification;
in response to the first battery parameter being outside the associated second battery parameter specification, trigger the power management controller to enter into a minimum power state—that further reduces power consumption and further extends the time until the battery reaches an over-discharged state;
determine whether a trigger condition has occurred following entry by the controller into the minimum power state, the trigger condition being one of (i) communication occurring on a system management bus (SMBus) in response to power being connected to a power connector, (ii) detection of a depressing of an on/off power switch after the power is connected to the power connector;
in response to the trigger condition, a management controller of the IHS:
exits the minimum power state and enters an on state; and transmits a signal on connecting wire to turn on the charge/discharge FET;
determine if the battery has been disconnected from the information handling system for greater than a first time period;
in response to the battery being disconnected for greater than the first time period, determine if the battery has been reconnected; and
in response to the battery being reconnected, trigger the power management controller to exit the minimum power state and enter an on state.

14. The information handling system of claim 13, wherein the firmware further configures the power management controller to:
- monitor a first elapsed time after a last detected system management bus communication;
- compare the first elapsed time to a first elapsed time threshold;
- in response to the first elapsed time being greater than the first elapsed time threshold, retrieve the first battery parameter;
- monitor a second elapsed time after a last detected system management bus communication;
- compare the second elapsed time to a second elapsed time threshold; and
- in response to the second elapsed time being greater than the second elapsed time threshold, trigger the power management controller to enter the storage mode.

15. The information handling system of claim 13, wherein the first battery parameter comprises at least one of a battery charge value, a battery capacity value, a battery voltage value and the first elapsed time.

16. The information handling system of claim 13, wherein the first battery parameter specification comprises at least one of a battery charge threshold, a battery capacity threshold, a battery voltage threshold, a first battery elapsed time threshold, and a second battery elapsed time threshold.

17. The information handling system of claim 13, wherein the firmware further configures the power management controller to:
- determine if another system management bus communication has occurred; and in response to the other system management bus communication occurring, trigger the power management controller to exit the minimum power state and enter into an on state; and
- determine if a power switch has been cycled; and in response to the power switch being cycled, trigger the power management controller to exit the minimum power state and enter into an on state.

18. The information handling system of claim 13, wherein the firmware further configures the management controller to:
- retrieve a battery disconnect time and a battery disconnect time threshold;
- determine if the battery disconnect time is greater than the battery disconnect time threshold;
- in response to the battery disconnect time being greater than the battery disconnect time threshold, determines if a battery reconnection to to the IHS has been detected;
- in response to detecting the battery reconnection to the IHS: retrieve at least one battery operating parameter and the associated battery operating parameter specification; determine if the retrieved battery parameter is greater than the associated battery parameter specification; and in response to the battery parameter being greater than the associated first battery parameter specification, exit the minimum power state and enter the on state and transmit the signal on the wire to turn on the charge/discharge FET.

* * * * *